United States Patent [19]

Hammond

[11] 4,055,032
[45] Oct. 25, 1977

[54] PROCESS FOR FORMING SEALED LIQUID FILLED BAGS

[75] Inventor: Michael George Ridler Hammond, Brunswick, Australia

[73] Assignee: A.C.I. Operations Pty. Ltd., Victoria, Australia

[21] Appl. No.: 728,914

[22] Filed: Oct. 4, 1976

Related U.S. Application Data

[63] Continuation of Ser. No. 533,162, Dec. 16, 1974, abandoned.

[30] Foreign Application Priority Data

Dec. 20, 1973 Australia ............................ 6063/73
May 24, 1974 Australia ............................ 7655/74

[51] Int. Cl.² .................... B65B 9/12; B65B 55/08; B65B 61/00
[52] U.S. Cl. .......................................... 53/14; 53/28; 53/128; 93/8 VB; 156/514

[58] Field of Search .................... 53/14, 28, 29, 128, 53/180 M, 182 M; 93/1 A, 8 R, 8 VB, 8 WA, 35 R, 61 B, 36 DA; 156/252, 253, 423, 513, 514, 552, 580; 222/105, 107

[56] References Cited

U.S. PATENT DOCUMENTS

| | | | |
|---|---|---|---|
| 2,214,944 | 9/1940 | Vogt | 53/27 X |
| 3,011,293 | 12/1961 | Rado | 53/14 |
| 3,306,001 | 2/1967 | Peppler | 53/27 |
| 3,400,866 | 9/1968 | Fattori | 222/511 |
| 3,434,908 | 3/1969 | MacDonald | 156/514 |
| 3,868,891 | 3/1975 | Parish | 93/8 VB |
| 3,894,381 | 7/1975 | Christine et al. | 53/14 X |

FOREIGN PATENT DOCUMENTS 402,978  5/1968  Australia ............................ 222/105

*Primary Examiner*—Robert Louis Spruill
*Attorney, Agent, or Firm*—Cushman, Darby & Cushman

[57] ABSTRACT

Tap attachment means are secured to an elongate web of heat sealable plastics material. The web is formed into a plurality of sealed liquid filled bags, each bag being formed from a length of the web to which is secured a tap attachment means. Each tap attachment means facilitates the draining of the liquid from the bag.

5 Claims, 8 Drawing Figures

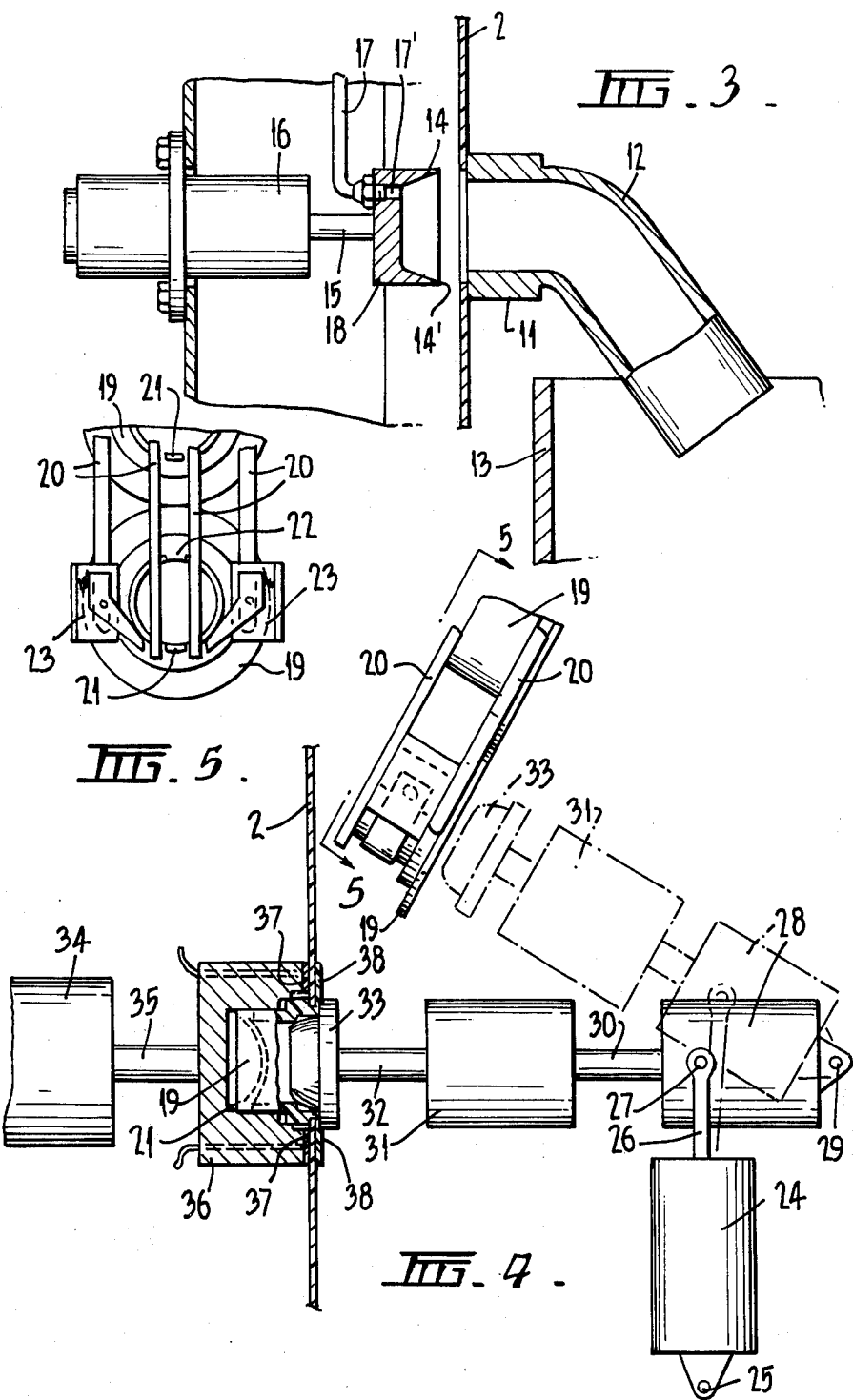

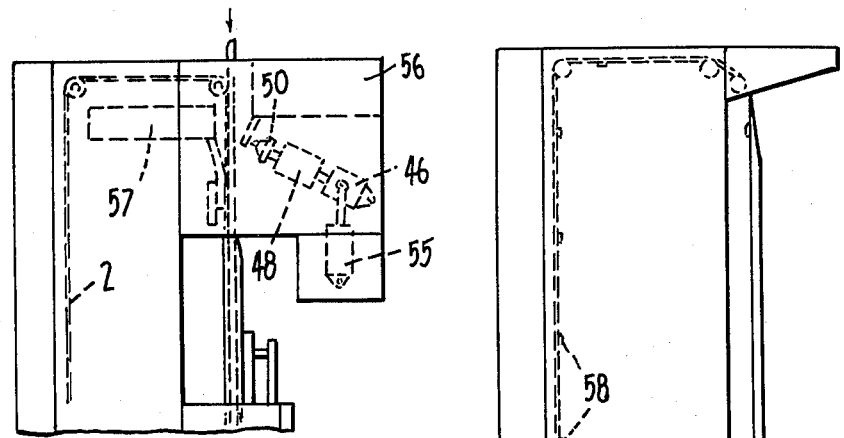
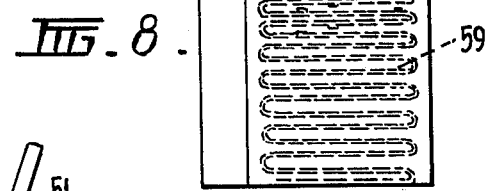
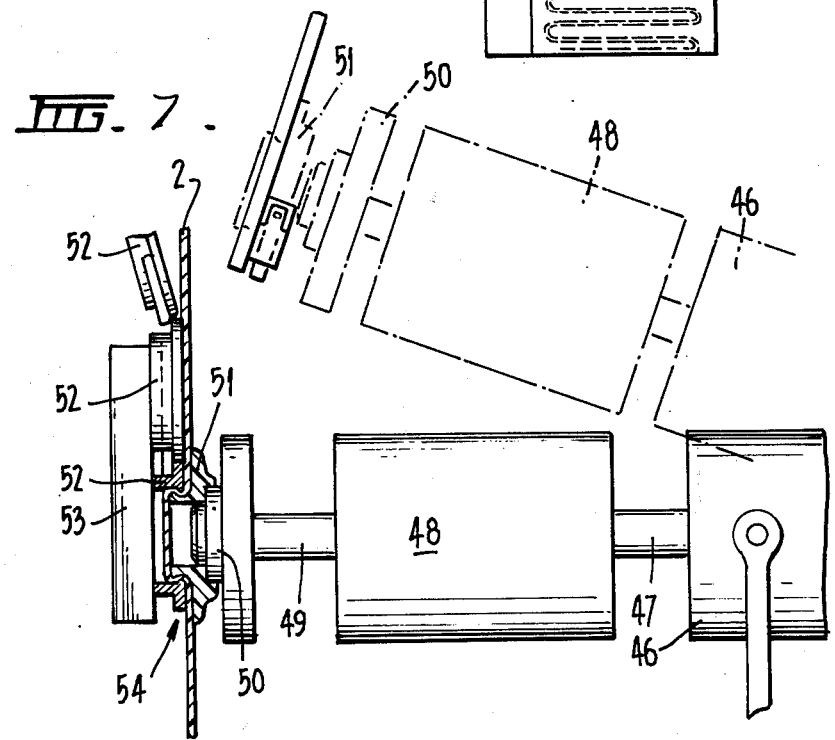

PROCESS FOR FORMING SEALED LIQUID FILLED BAGS

This is a continuation, of application Ser. No. 533,162 filed Dec. 16, 1974 and now abandoned.

BACKGROUND OF THE INVENTION

This invention relates to packaging liquids, and relates particularly to packaging liquids such as unfortified wines, which deteriorate when exposed to air, in packages formed from heat-sealable substantially air-impermeable plastics material.

It has been proposed to provide a rigid container having disposed therein a flexible bag or lining of a film formed from a material such as ethyl vinylacetate coated with polyvinylidene chloride for holding liquid stored in this container. Means are provided at or near the base of the container for tapping the container so that liquid therein may be withdrawn therefrom. Such means include a dispensing closure or tap located in a wall of the bag or the lining, whereby the liquid therein may be dispensed in desired quantities.

The container may also be provided with a vent, usually at or near its upper end, so that when liquid is withdrawn from within the flexible lining air will flow into the container outside the flexible lining to cause the lining to collapse around the liquid remaining in it. In this form of container the air admitted through the vent does not come in contact with the liquid, so that even a liquid which deteriorates when exposed to air may be stored for an appreciable period. Such containers are hereinafter referred to as "bag-in-box" containers.

Generally bag-in-box containers are supplied to packagers in the form of separate components which may be readily assembled. For example, the components may be a cardboard box blank, a single or multilayered flexible bag having an open socket through which the bag may be filled with liquid, and a tap adapted to fit onto the socket. Alternatively, the bags may be open-ended with a closed socket such that they may be filled through the open ends and subsequently heat sealed.

During the time which elapses between manufacture of the flexible bags and filling of the bags with liquid, there is always the risk that the interior of the bags will become contaminated with bacteria or mould which may enter the bags through the open sockets or ends. Thus, packagers, in order to minimize contamination, are obliged to use the bags as soon as possible rather than keep them in storage for long periods as sterilization of the bags prior to filling is difficult.

In addition, when filling through the socket the narrowness of the socket opening makes very rapid filling of the bags with liquid difficult. Furthermore, considerable manual labor and time is required for the filling of the individual bags irrespective of whether they are filled through an open socket or an open end.

Yet another disadvantage of using pre-formed bags is that a shipment of bags may be manufactured and sent to a packager who finds that the seals on a number of the bags are not leak-proof. This may be caused by the use of incorrect heat sealing settings on the bag manufacturing machines of the bag manufacturer. As the manufacturer has no practical way of testing all his bags, a complete shipment or production run of bags may have to be scrapped because of a few defective bags.

It is also known to produce, and fill with liquid or another flowable substance, packages formed from heat-sealable, air-impermeable sheet material.

The production and filling of such packages is normally carried out by form/fill/seal machines. In general, form/fill/seal machines operate by folding a web of heat sealable film such as a single thickness cellulose acetate web coated on both sides with polyethylene or polyvinylidene chloride combined with ethylvinyl acetate upon itself along its length, heat sealing the overlapped portion of the lengthwise fold to form a tube and closing the bottom of the tube formed in this manner by a heat seal. Prior to, or during the heat sealing and folding operations the web is usually sterilized by irradiation with ultra-violet light to reduce the risk of contamination by mould or fungi. A measured amount of liquid is introduced into the open end of the tube and a portion of the tube is again heat sealed to form a sealed bag containing liquid. Thus the second heat seal forms the bottom seal for a succeeding bag and the filling operation is repeated. The heat seal between the succeeding bags is then separated to form separate liquid filled bags. As the filling operation is automatic and requires no manual labor, the rate of filling can be increased substantially over that of the prior described methods.

Furthermore, any incorrect setting of the seal forming mechanism of the form/fill/seal machine can be immediately detected because of leakage from the bags being formed. Hence it is possible to make immediate adjustment to the sealing machine settings with a consequent minimisation of lost production and wasted bag marking materials.

Packages produced by form/fill/seal machines are unsuitable for use in bag-in-box containers, as the packages do not contain means whereby the liquid in the package may be dispensed.

SUMMARY OF THE INVENTION

In accordance with the teachings of the present invention a plurality of tap attachment means are secured to an elongate web of plastics material, before the web is formed into a plurality of sealed, liquid filled bags, each package being formed from a length of the web to which a tap attachment means has been secured.

It is therefore an object of this invention to provide a novel method for producing liquid-filled packages suitable for use in bag-in-box containers.

It is a further object of this invention to provide a novel apparatus for producing such liquid filled packages.

Further objects and advantages of the present invention will be apparent from the following description, reference being made to the accompanying drawings wherein preferred forms of the present invention are clearly shown.

In the Drawings

FIG. 3 is a section through a device for cutting holes in a web of sheet material.

FIG. 4 is a section through a device for inserting dispensing closures in and securing the closures to a web of heat-sealable sheet material.

FIG. 5 is a view along the lines 5–5 of FIG. 4.

FIG. 6 is a sectioned side elevation of the top portion of a form/fill/seal machine modified in accordance with a further embodiment of the present invention.

FIG. 7 is a section through apparatus for attaching a tap attachment means to a web of sheet material.

FIG. 8 is a sectioned side elevation of a form/fill/seal machine modified in accordance with a still further embodiment of the present invention.

DESCRIPTION OF THE PREFERRED EMBODIMENTS

Figures 1, 2:
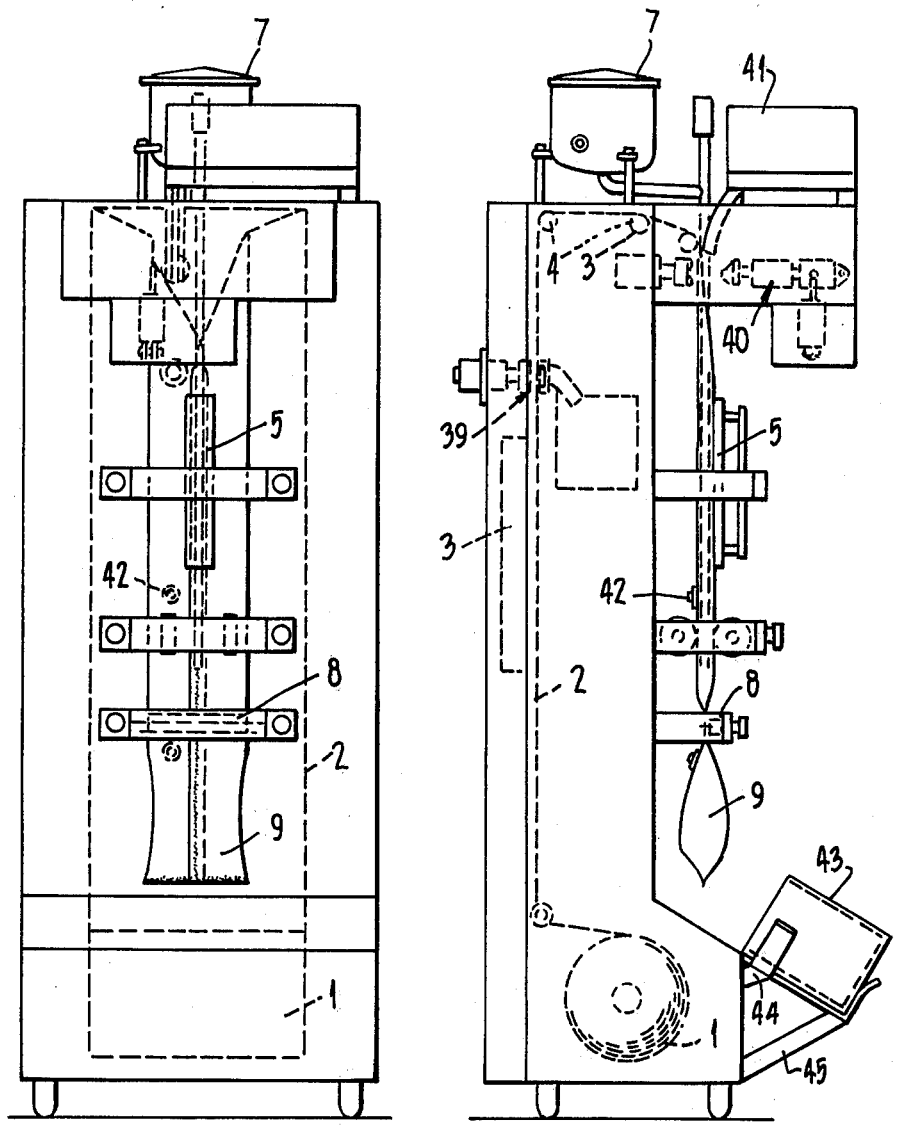
FIG. 1 is a front elevation of a form/fill/seal machine modified in accordance with an embodiment of the present invention.
FIG. 2 is a side elevation, partly in section, of the machine of FIG. 1.

Referring to FIGS. 1 and 2, there is shown a form-/fill/seal machine constructed basically as a conventional form/fill/seal machine for example, a Prepac I S-1.

A preferred material for use is the heat-sealable plastics material in the machine is ethyl vinyl acetate film coated with poly-vinylidene chloride, but other materials such as polyethylene and polypropylene are suitable. The film may in fact be formed from two or more films drawn from two or more rolls. Once the films have been unwound from their respective rolls, and commence concurrent movement through the machine, they are treated as one film and for the purposes of the following description, reference to a film will include reference to two or more films.

The conventional part of the form/fill/seal machine of FIGS. 1 and 2 includes a roll 1 of heat sealable film. Film is withdrawn from the roll 1 as an elongate web 2 which is initially passed in front of an ultra-violet tube 3 which sterilizes the web, and is then guided over rollers 4 and a forming plate (not shown) which folds the sides of the web into an overlapping relationship, as shown by the broken lines in FIG. 1. A heating device 5 forms a longitudinal heat seal to join the overlapping sides of the web to form a tubular position 5 which surrounds a supply tube 6 through which the liquid to be packaged is dispensed from the supply tank 7.

A heat sealing and cutting device 8 forms a transverse heat seal to join one side of the tubular portion to the other side, and makes a transverse cut in the seal portion to separate the tubular portion below the device 8 from that above the device. Shortly after the seal is formed, a metered amount of liquid is dispensed into the tubular portion of the web and the tubular portion containing liquid is advanced a distance corresponding to one package. A further sealing and cutting operation is performed by the device 8 to form a package 9 filled with liquid.

All of the operations of the machine, the advancement of the web, the formation of the longitudinal seal in the web, the filling of the open bag with liquid, and the final sealing and cutting operation, are performed sequentially to automatically produced finished packages. In the Prepac I S-1, all of the operations are controlled by a single rotating revolving shaft, powered by a ¾ horsepower reduction gear, and equipped with a series of cams, each of which corresponds to one of the machines functions. However, any known means which will provide automatic sequential operation of the various components of the machine, may be used.

The present invention envisages the securement of tap attachment means in the form of a tap attachment or dispensing closure to a web of heat-sealable film, either as a separate operation, or as part of the operation of a form/fill/seal machine. One embodiment will now be described with reference to the apparatus shown in FIGS. 1 to 5, in which the tap attachment means is in the form of a dispensing closure of the Fattori type.

Fattori closures generally comprise a tubular spout which is provided at one end with an annular heat weldable flange which may be welded to a plastic bag or web of plastics material. The opposite end of the spout is provided with a manually deformable diaphragm which is used to regulate or stop the flow of liquid through the spout. Such closures are described in more detail in U.S. Pat. No. 3,400,866 issued Sept. 10, 1968 to Lazzaro A. Fattori.

FIG. 3 shows apparatus for cutting holes in the web 2 prior to the attachment of a dispensing closure to the web. The apparatus comprises a stationary cutting block 11 having an aperture therethrough, which aperture communicates with a curved tubular chute 12, leading to a waste storage container 13.

On the opposite side of the web 2 is an annular cutting blade assembly 14 attached to the rod 15 of a piston which is adapted for reciprocating motion in a pneumatic cylinder 16. A tube 17 connected to a compressor or equivalent apparatus (not shown) is attached to the rear of the cutting blade 14' and communicates with an aperture 17' extending through the base 18 of the assembly 14 to the center of the assembly.

In operation, the piston moves in sequence with the advancement of the web 2 to press the cutting blade 14' of the assembly 14 against the cutting block 11 thereby cutting a circular portion of a predetermined size from the web 2. An air blast provided by the tube 17 forces the cut portion of the web 2 through the aperture in the cutting block 11, and the chute 12 into the container 13. The piston retracts, the web is advanced, and the next cutting operation takes place.

FIGS. 4 and 5 show apparatus for securing a Fattori closure to a web 2 of heat-sealable film which has previously undergone a cutting operation to remove a circular piece of material.

Fattori closures 19 are oriented and delivered from a vibratory hopper into a delivery chute incorporating guides 20 which cooperate with protrusions 21 on the closure to maintain the orientation of the closures so that the orifice 22 thereof is uppermost. A spring loaded clamp 23 retains the lowermost closure between the guides at a pick up position until the remainder of the apparatus removes the closure in the manner described hereinafter.

The remainder of the apparatus of FIG. 4 consists, on one side of the web 2, of a pneumatic cylinder 24, pivotally mounted on fixed support at 25. The rod 26 of the piston disposed in the cylinder 24 is pivotally connected at 27 to a second pneumatic cylinder 28. The cylinder 28 is pivotally mounted to a fixed support at 29. The action of the piston in the cylinder 24 serves to move the cylinder 28 from a first position shown in broken lines in FIG. 4 to a second position illustrated in solid lines.

A third pneumatic cylinder 31 is attached to the rod 30 of the piston disposed in cylinder 28, and a mandrel 33 is attached to the rod 32 of the piston disposed in cylinder 31.

There is a fourth pneumatic cylinder 34 attached to a fixed support. The cylinder 34 is located on the other side of the web 2 and opposite the mandrel 33 when the cylinder 28 is in the second position. The rod 35 of the piston disposed in the cylinder 34 is attached to a sealing block 36 which is provided with an annular heating element 37 on the face of the sealing block disposed towards the web. (All four cylinders, 24, 28, 31 and 34 together with their associated pistons and rods, are actuated sequentially in a conventional manner, by compressed air.)

The operation of securing the plastic flange of a Fattori closure to the web commences when cylinder 24 is actuated to move cylinder 28 into the first position. Cylinder 31 operates to push the mandrel 33 into a closure 19. Cylinder 24 then operates to place cylinder 28 in the second position. In doing so, the cylinder 31 and mandrel 33 are also caused to move arcuately. The closure 19 is forced by the movement of the mandrel 33 past the spring loaded clamp 23 into a position co-axial with the hole in the web 2.

Cylinder 31 is then actuated to push the closure 19 into the hole in the web, and at the same time cylinder 34 is actuated to push the sealing block 36 against the web. This is shown by the unbroken line diagram in FIG. 4. The annular heating element 37 heat welds the heat sealable film and the heat sealable annular flange 38 of the closure 19 to securely attach the closure to the web with an annular weld. Subsequently, the cylinders 31 and 34 retract the mandrel 33 and the sealing block 36 respectively, the web is advanced, and the sequential closure-attaching operation is repeated.

The operations described with reference to FIGS. 3, 4 and 5 may occur as part of the operation of the form-/fill/seal machine illustrated in FIGS. 1 and 2 simultaneously with the formation of the web into liquid filled packages. Thus the apparatus disclosed with reference to FIG. 3 may be situated in the form/fill/seal machine as shown at 39 and the apparatus described with reference to FIGS. 4 and 5 may be situated in the form/fill-/seal machine at 40, receiving dispensing closures from a vibratory hopper 41.

As part of the sequential operations of the machine, the apparatus 39 will punch holes in the web 2, the holes being off-center, and spaced apart a distance determined by the dimensions of the liquid filled bag. The apparatus 40 will operate to insert a Fattori closure into each hole in the web, and weld the closure to the web.

As the web advances through the machine and is formed into a tube, each closure is situated in the inner wall of the tube, as shown at 42. After the filling, sealing and cutting operation, the closure is in a predetermined position relative to the ends of the liquid filled package.

The filled package drops into a container 43, supported by arms 44 and 45. The container 43 is preferably the external rigid container of a bag-in-box container.

In such a preferred case only the top of the container 43 needs to be sealed, in conventional fashion, and the total bag-in-box container is suitable for sale and use. In bag-in-box containers, it is normal practice to provide a scored or perforated area of the external container, which area may be removed manually. The closure is situated near the section and may be manually located between the sides of the aperture formed by the removal of the area. In the embodiment of FIGS. 1 and 2, the closure may be located on the web in such a position that it corresponds with an opening defined by a scored or perforated area of the box in which it is placed thereby allowing easy access to the closure. As an alternative to the above described arrangement of attaching the apparatus of FIGS. 3, 4 and 5 to a form/fill/seal machine such that the application of tap means to the web occurs simultaneously with the formation of liquid filled packages, it is equally possible to completely separate the two processes of attaching tap means to the web and forming the web into liquid filled packages. Thus the apparatus of FIGS. 3, 4 and 5 can be operated independently of the form/fill/seal machine to produce a web having attached tap means. This web can at some later date be fed into a form/fill/seal machine to form liquid filled packages which are each provided with tap means.

FIGS. 6 and 7 describe another embodiment of the invention. In this embodiment, the tap attachment means which is a socket, instead of a tap means in the form of a dispensing closure, is attached to the web of heat-sealable film. The socket may be formed from two annular elements which clip together to form the socket, into which tap means may be friction fitted.

FIG. 7 shows apparatus for attaching such sockets to a web 2 of heat sealable film. The apparatus comprises a pneumatic cylinder 46 which is pivoted, and operated by another pneumatic cylinder in the same fashion as cylinder 28 in FIG. 4. The rod 47 of the piston of cylinder 46 is connected to another pneumatic cylinder 48, and the rod 49 of the piston of cylinder 48 is connected to a mandrel 50.

The two annular elements which form each socket are described arbitrarily as outer elements 51 and inner elements 52. The elements are fed from vibratory hoppers (not shown) between guides, (not shown) similar to those shown in FIGS. 4 and 5. Each guide ends in a spring loaded clamp similar to that shown in FIG. 5.

Elements 51 are fed down on the same side of the web 2 as cylinders 46 and 48, and coacting elements 52 are fed down a chute (not shown) on the opposite side of the web 2 into position against rigid backing block 53 located opposite the lowermost position of the cylinders, the web lying between the block and the cylinders.

The cylinder 46 in the position shown in broken lines in FIG. 7 operates in much the same way as cylinder 28 of FIG. 4, to force the mandrel 50 into the element 51 and the equivalent cylinder (not shown) to cylinder 24 of FIG. 4 brings the cylinder 46 to the position shown in solid lines in FIG. 7.

At this stage, an element 52 (shown in section in FIG. 7) is situated directly opposite the element 51 which is seated on the mandrel 50. Cylinder 46 operates to push the mandrel and the element 51 against the web 2. The web deforms, and the element 51 snaps into element 52, movement of element 52 being restrained by the backing block 53.

It can be seen that the web 2 is not broken or severed in the area where the elements 51 and 52 have been combined to form a socket 54. However, it is preferable for the purposes of ensuring a liquid tight seal to insert, in the area of the socket, a backing strip of polyethylene film between the web 2 and the element 52.

Once the socket has been formed, the cylinder 48 operates to withdraw the mandrel, the web is advanced and the operation to form the next socket commences.

Once again, the operations described with reference to FIG. 7 may be carried out on a web of heat-sealable film, and the web subsequently used to form liquid-filled packages, or the apparatus of FIG. 7 may form part of a form/fill/seal machine as illustrated in FIGS. 1 and 2 to secure tap attachment means to the web simultaneously with the formation of the web into liquid filled packages. FIG. 6 shows part of the top of a form/fill-/seal machine, with the apparatus of FIG. 7 shown in broken lines. Pneumatic cylinder 55, not shown in FIG. 7, but equivalent to cylinder 24 in FIG. 4, is shown, together with vibratory hoppers 55 and 57 which release elements 51 and 52 respectively.

The apparatus of FIG. 7, as part of a form/fill/seal machine as shown in FIG. 6, operates sequentially to form sockets on the web, preferably in the same position as the Fattori closures of FIGS. 1 and 2. Bag-in-box containers would be formed in the same manner as described with reference to FIGS. 1 and 2, except that when the scored or perforated area of the outer container is removed, a socket 54 will be exposed.

To enable the contents of such a bag-in-box container to be dispensed, a tap is fitted in the socket 54 of the liquid-filled package. A suitable tap comprises a body, one end of which incorporates a piercing member, and the other end provides means to open and close the tap. The tap is pushed into the annular socket 54 with the piercing member innermost. The member will rupture the film within the socket, and on being pressed further, the body of the tap is retained in a friction fit by the socket. With the film ruptured, the opening and closing means may be operated to dispense the liquid within the container. A suitable dispenser tap system along these lines is described in Australian patent specification Nos. 402,978, 403,840 and 407,456 to Malpas.

FIG. 8 illustrates the manner in which a web 2 of heat-sealable film having pre-applied tap means may be stored in a form/fill/seal machine prior to formation of liquid-filled packages from the web. Taps, dispensing closures or sockets 58, are attached by the manner described in FIGS. 1 to 7 or in any other suitable manner. As an alternative to this method the web with attachments may be placed in roll form. However, the use of a roll would probably be less satisfactory as the tap means on the web are bulky and would give rise to uneven winding around the roll.

Although the invention has been described in considerable detail in respect to preferred embodiments thereof, it should be apparent that the invention is capable of numerous modifications and variations which are readily apparent to those skilled in the art without departing from the spirit or scope of the invention as defined in the appended claims.

I claim:

1. A process for continuously forming sealed liquid filled dispenser bags in a high speed automated operation from an elongate web of heat sealable plastics material comprising:
   i. punching holes in said web along the length thereof at predetermined spaced intervals;
   ii. orienting a plurality of dispensing closures relative to an orifice provided therein;
   iii. feeding the dispensing closures in single file to a pick up position while maintaining said dispensing closures in said oriented configuration, said dispensing closures comprising attachment means having a spout with an annular flange, a diaphragm member mounted on said attachment means, said diaphragm member being manually deformable to allow flow of liquid through said spout and out of the orifice in said dispensing closure;
   iv. moving dispensing closures singly from said pick up position into registry with each of said holes in said web such that a spout protrudes through each hole and the respective flange is brought into contact with the web immediately surrounding the respective hole;
   v. heat sealing each flange to said web,
   vi. forming said web into an upwardly directed tube by folding the web upon itself and heat sealing the overlapped portion formed thereby, whereby each flange which has been heat sealed to said web is disposed in the interior of said tube;
   vii. transversely sealing a portion of said tube;
   viii. separating the upper and lower portions of said tube at said heat seal during said heat sealing of said tube portion;
   ix. dispensing a metered amount of liquid into said upper tube portion;
   x. moving said upper tube portion containing liquid downwards; and
   xi. repeating steps (vii) and (viii) to form a sealed liquid filled bag having a dispensing closure secured thereto which is separated from said tube and an upper tube portion which is arranged to receive a further metered amount of liquid.

2. A process according to claim 1 wherein said web is irradiated with ultra violet light prior to formation of said web into a tube.

3. A process according to claim 1 wherein said web comprises two or more sheets of plastics material superimposed on each other.

4. A process as in claim 1 wherein said web is advanced so as to locate each of said holes in sequence at an attaching position and wherein said dispensing closures are oriented in a row with their axes parallel to and spaced apart from each other, said axes extending at an angle to the axis of the hole which is located at the attaching position.

5. A process as in claim 4 wherein the step of moving a dispensing closure into registry with a hole at the attaching position includes inserting a mandrel axially into the orifice of the respective closure and then swinging the mandrel and the respective closure to a position in registry with the respective hole.

* * * * *